Figure 3:
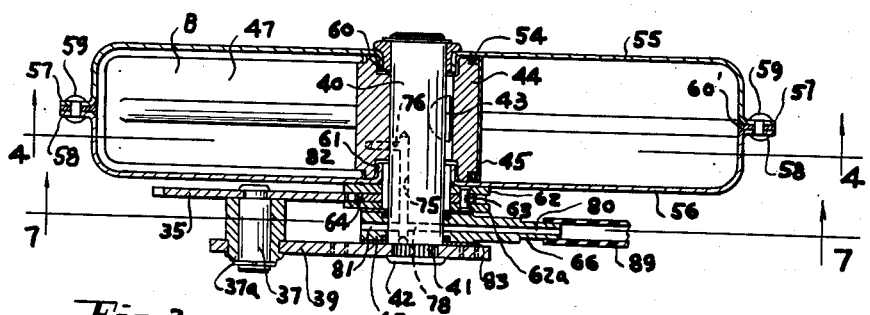

Feb. 9, 1954     F. C. BEST ET AL     2,668,520
FLUID OPERATED MOTOR
Filed Dec. 23, 1949     5 Sheets-Sheet 1
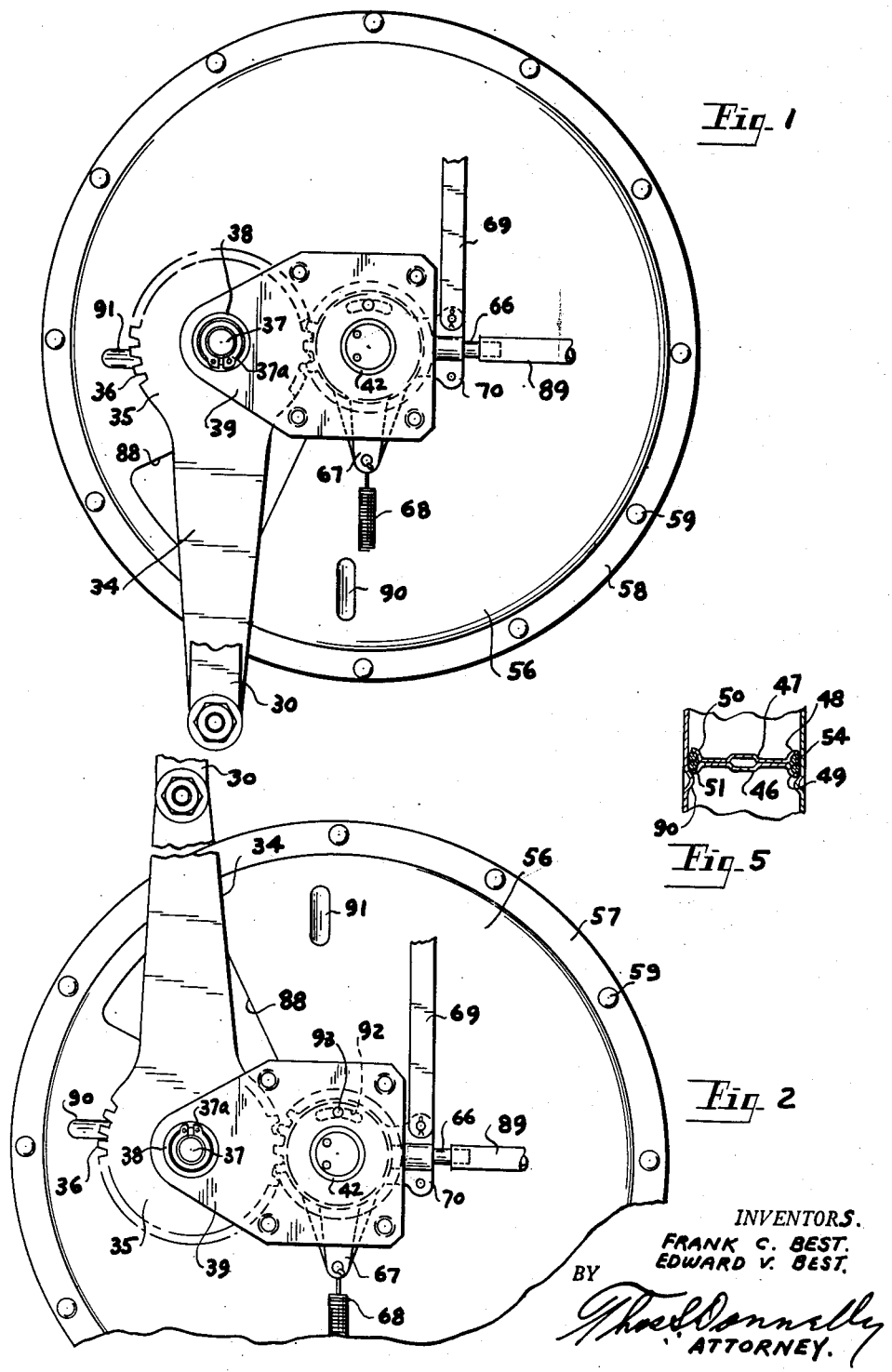
INVENTORS.
FRANK C. BEST.
EDWARD V. BEST.
BY Thos. Donnelly
ATTORNEY.

Feb. 9, 1954   F. C. BEST ET AL   2,668,520
FLUID OPERATED MOTOR
Filed Dec. 23, 1949   5 Sheets-Sheet 2

INVENTORS.
FRANK C. BEST.
EDWARD V. BEST.
BY
*Thos. L. Donnelly*
ATTORNEY

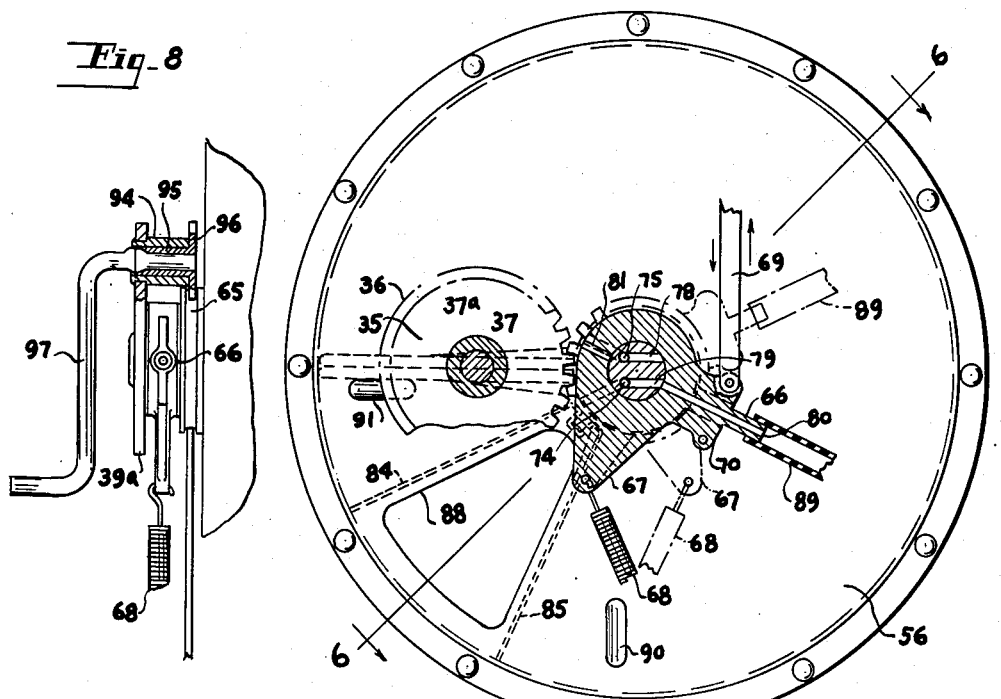

Feb. 9, 1954  F. C. BEST ET AL  2,668,520
FLUID OPERATED MOTOR
Filed Dec. 23, 1949  5 Sheets-Sheet 4

INVENTORS.
FRANK C. BEST.
EDWARD V. BEST.

BY Thos. S. Donnelly
ATTORNEY

Patented Feb. 9, 1954

2,668,520

UNITED STATES PATENT OFFICE 2,668,520

FLUID OPERATED MOTOR

Frank C. Best and Edward V. Best,
Royal Oak, Mich.

Application December 23, 1949, Serial No. 134,792

5 Claims. (Cl. 121—44)

The present invention relates to fluid operated motors and particularly to those operated by a partial vacuum or hydraulics. The invention is particularly adapted for use in raising and lowering windows of a vehicle, car door and for other apparent purposes and when used with a vehicle the partial vacuum may be obtained from the intake manifold of the internal combustion engine which is used to propel the vehicle.

It is an object of the present invention to provide a motor of this class which will be simple in structure, economical of manufacture, durable, compact and highly efficient in use.

Another object of the invention is the provision of a motor of this class which may be easily and quickly assembled.

Another object of the invention is the construction of a motor so arranged that a maximum torque or thrust may be obtained from the motor thus making it highly efficient when operated for raising or lowering windows of a vehicle which is driven by an internal combustion engine and from which engine the partial vacuum is obtained for operating the mechanism.

Other objects will appear hereinafter.

Shown in the drawings are several embodiments but it is recognized that other modifications might be made without departing from the invention.

Figure 4:
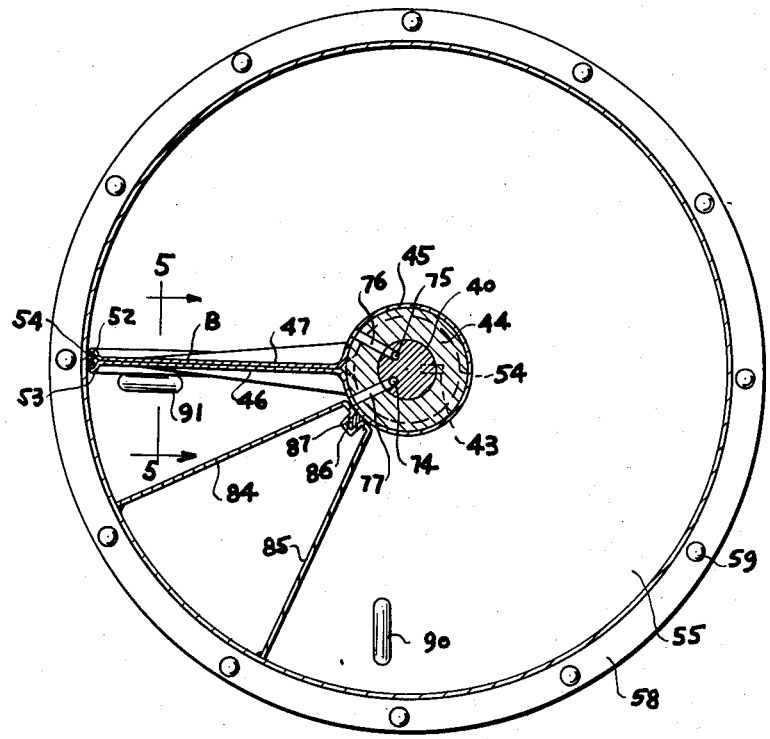
Figure 6:
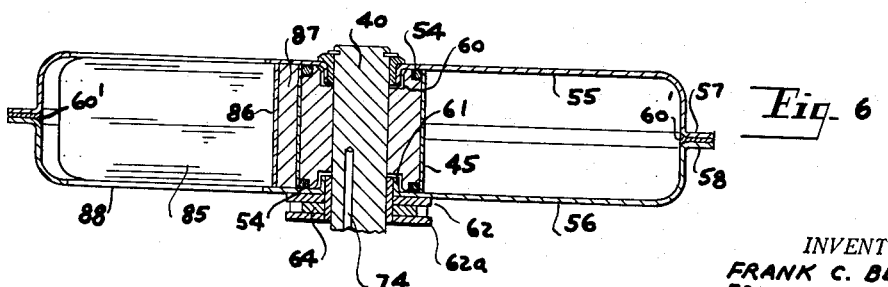
Figure 11:
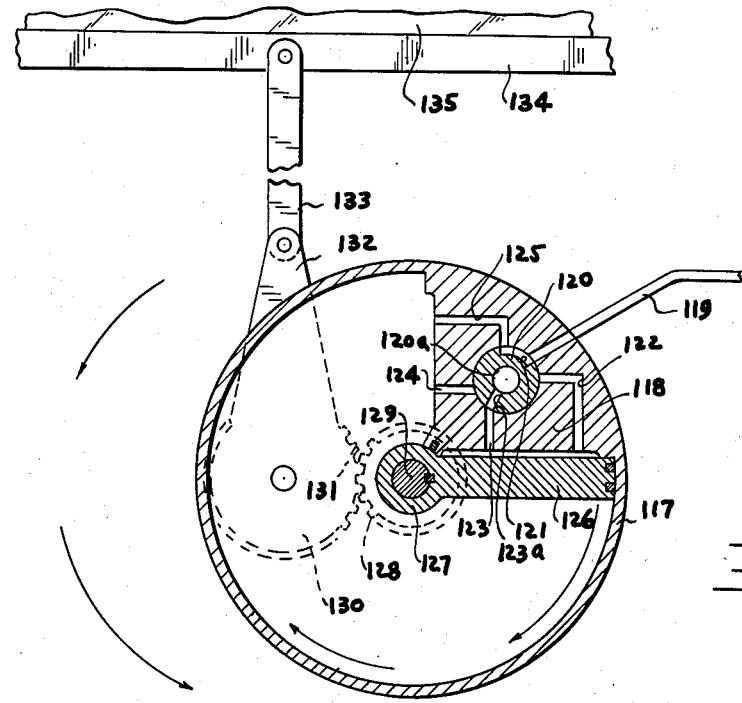
Figure 12:
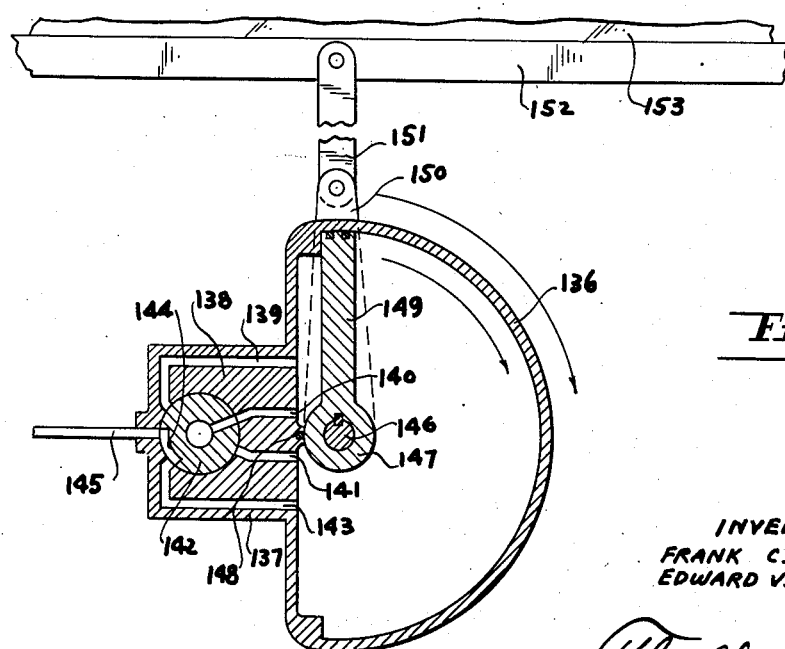
Figure 13:
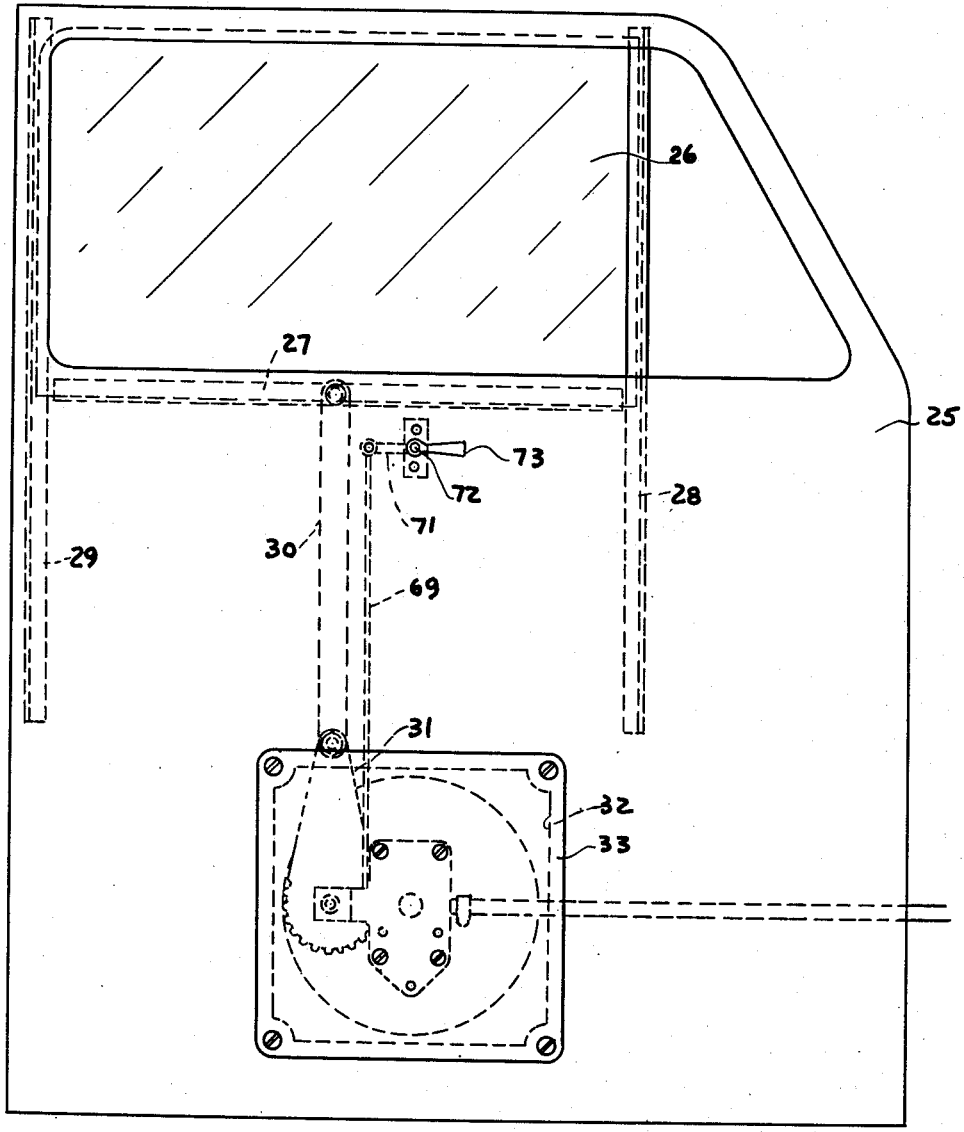

Forming a part of this specification are drawings in which:

Fig. 1 is a front elevational view of the invention with parts broken away showing the parts in one position, Fig. 2 is a fragmentary front elevational view of the invention with parts broken away showing the mechanism in another position, Fig. 3 is a transverse sectional view of the invention taken centrally thereon, Fig. 4 is a sectional view taken on line 4—4 of Fig. 3, Fig. 5 is a fragmentary sectional view taken on line 5—5 of Fig. 4, Fig. 6 is a sectional view, slightly reduced in size, taken on line 6—6 of Fig. 7, Fig. 7 is a sectional view taken on line 7—7 of Fig. 3, Fig. 8 is a fragmentary side elevational view with parts in section, and parts broken away illustrating a hand operated crank for manual operation, Fig. 9 is a fragmentary sectional view showing a slight modification of the structure shown in Fig. 3, Fig. 10 is a sectional view showing a modification illustrating parts in section and parts broken away, Fig. 11 is a front elevational view of a further modification with parts broken away and parts shown in section, Fig. 12 is a front elevational view of a further modification of the invention with parts broken away and parts shown in section, Fig. 13 is a schematic view illustrating the invention mounted for raising and lowering a window on a vehicle door.

In the drawings as shown in Fig. 13 we have illustrated the invention used in connection with a vehicle door 25 having a window 26 which is adapted to slide vertically, and which is provided at its lower edge with a rim 27, the end edges of the window 26 sliding in guides 28 and 29. The upper end of a bar 30 is pivotally connected to the strip 27 and, at its lower end, this bar 30 is connected pivotally to one end of a segment arm 31 which is positioned in a recess 32 formed in the door 25 and closed by a cover plate 33.

As shown in Fig. 1 this segment arm 34 is provided at its opposite ends with a head 35 provided with teeth 36 on its periphery. As shown in Fig. 3, this head 35 is mounted for rotation on the axle 37 which projects through the bushing 38, this bushing 38 being fixedly mounted on the supporting plate 39, and the shaft 37 being held in position by a split ring 37a. This plate 39 has an opening formed therethrough, through which extends the reduced knurled portion 41 of the shaft 40, the end of the shaft being upset as at 42 to securely mount the plate 39 on the shaft 40. A key 43 serves to connect the shaft 40 and the sleeve 44 for rotation in unison with each other.

In the invention is used a vane or blade B which is shown in the drawings as being formed from a single sheet of light metal having the portion 45 which embraces the sleeve 44 and which is turned outwardly radially therefrom to provide the pair of plates 46 and 47. As shown in Fig. 5 the plate 47 is provided with a flange 48 spaced apart from a flange 49 formed on the plate 46 to provide a channel along the side edges of one side. Similar flanges 50 and 51 are formed on the plates 47 and 46 at the other side to provide a channel. The end portions of these plates 46 and 47 are provided with the flanges 53 and 52 which cooperate to form a channel at the end edge of the blade or vane B. Mounted in these channels is an endless flexible sealing strip 54 which also passes around the sleeve 44 at opposite ends, this sleeve 44 being cut away as at 45 at its opposite ends to provide a groove for reception of the sealing strip.

In the invention is employed a hollow housing or drum comprising a pair of sections 55 and 56 each of which is formed cup-shaped and provided at its open end with the outwardly projecting flanges 57 and 58 which are secured together by the rivet 59, a layer 60 of sealing material being clamped between these flanges 57 and 58. A central opening is provided in the bottom of each of these cup-shaped sections and at these central openings an inwardly turned sleeve 61 is formed to project into the cut away section 60 formed in the sleeve 44 so that a housing is thus rotatively mounted relatively to the sleeve 44 and in operation this housing rotates about the axis of the shaft 40. A plate 62 is secured to one of the faces of the housing and spaced from this plate is another plate 62a. Positioned between these plates 62 and 62a is a gear 64 which meshes with the teeth on the head 35. Rivets 63 are projected through the plates 62 and 62a as well as the gear 64 to provide a unitary assembly.

Rotatively mounted on the shaft 40 is a collar 65 projecting outwardly from one side of which is a tube 66 having a passage 80 formed therethrough. Projecting outwardly from this collar 65 which is shown in Fig. 3 is an arm 67 clearly shown in Fig. 1. Connected at one end with this arm 67 is a spring 68 the opposite end of which is connected to the housing. As shown in Fig. 1 there is projecting outwardly from the collar 65 a bracket 70 to which is connected one end of an operating bar 69, this connection being a pivotal one. As shown in Fig. 1 this operating bar 69 is pivotally connected at its upper end with the link 71 which is fixedly mounted at its opposite end on the pin 72 to which is fixedly mounted a handle 73 whereby the pin 72 may be rocked to effect the reciprocation of the bar 69.

Formed in the shaft or axle 40 and extending axially thereof are the spaced apart passages 74 and 75 adapted for communicating with the radially directed passages 76 and 77 formed in the sleeve 44 as shown in Fig. 4.

Formed at the location of the collar 65 through the shaft or axle 40 are the spaced apart passages 78 and 79, the passage 78 being adapted for communication with the passage 75, the passage 74 being adapted for communication with the passage 79 as shown in Fig. 7. In alignment with the passage 80 formed through the tube 66, as shown in Fig. 3, is an exhaust passage 81. Positioned around the shaft 40 at the collar 65, as shown in Fig. 3 are the sealing gaskets 82 and 83.

Positioned in the housing is a partition embodying a strip of metal formed to provide the plates 84 and 85 having the channel 86 at their meeting point for reception of a sealing strip 87. Found in one of the sections, as shown in Fig. 2, at the location of the partition members 84 and 85 is an opening 88. In forming the structure, the members 84 and 85 are mounted in one of the sections so as to extend upwardly therefrom, these members 84 and 85 being of the same width as the housing so that the opposite side edges of these members 84 and 85 engage the bottoms of the oppositely disposed cup-shaped members. After these members 84 and 85 are mounted in one of the cup-shaped members, the other is positioned over it and the assembly shown in Fig. 3 is accomplished. In order to seal around the edges of the members 84 and 85 at their meeting with the face of the cup-shaped member positioned thereover, the opening 88 is provided and the assembler by inserting the hand in the opening 88 may spray or otherwise deposit along the meeting edges, sufficient sealing material to form a leak-proof connection so that the meeting of these parts will be leak-proof as to gas or air under pressure.

On vehicle doors as now constructed there is sufficient room at the bottom of a door to install the apparatus as it may be made quite compact. It is preferred that the housing be formed from sheet metal so that the structure is light. In operation when the assembly has been made as shown in Fig. 13, and the operator desires to raise or lower the window, the handle 73 would be moved upwardly or downwardly, so as to move the bar or rod 69 upwardly or downwardly and thus rock the collar 65 in one direction or the other. The tube 89 would of course be attached to a source of fluid and in the description we will assume that it is attached to the intake manifold so that there is a suction outwardly through the tube 89. Upon rocking the handle 73 so as to force the rod or bar 69 downwardly, the collar will be rocked to the right of Fig. 2, the degree of rocking being limited by the pin 93 which is engaged in the slot 92. This rocking will be against the tension of the spring 68. When rocked in this position as shown into Fig. 7, the passage 74 will be brought into communication with the passage 80 so that suction will be set up in the passage 74 and this passage 74 would communicate as shown in Fig. 4 through the passage 77 with the interior of the housing at one side of the blade or vane B. At the same time, the passage 75 which communicates through the passage 76 with the interior of the housing at the opposite side of the blade B, will be brought into communication with the passage 81 as shown in Fig. 7 thus opening the interior of the housing at one side of the blade or vane B to the atmosphere and establishing a partial vacuum at the opposite side of the blade. This will cause a rotation of the housing until the blade or vane B contacts either with the stops 90 or 91 which are punched inwardly from the faces of the housing section. As the housing rotates, it will rotate the gear 64 which is in mesh with the teeth on the head 35 so as to rock the segment bearing arm 34. This rocking may be effected from the position shown in Fig. 2 to the position shown in Fig. 1, depending upon whether or not the operator desires the window to be entirely open. Immediately upon releasing the downward pressure on the handle 73, the spring 68 will serve to rock the collar backwardly into normal or neutral position and thus the window will remain stationary at the selected point. Should the handle be rocked in the opposite direction, the collar would be swung so that the passage 81 would be in communication with the passage 79 thus establishing communication of the passage 74 with the atmosphere and at the same time, passage 78 would be brought into communication with the passage 80 thus establishing communication of the passage 75 with the source of vacuum, so that the movement of the housing would be in the opposite direction and the segment arm 34 would swing upwardly to the position shown in Fig. 2 so as to close the window.

Experience has shown that at times the power operated mechanism may not operate due to failure of the engine to function. In Fig. 8 we have illustrated a modification in which the attachment may be added to the structure so that the window may be raised and lowered manually. Mounted on the plate 39a which corresponds with the plate 39 is a bushing 94 in which is positioned a sleeve 95 carrying a gear 96 which meshes with the gear 65 and which may be rotated by the crank 97.

In Fig. 9 we have shown a further slight modification in which the collar 65 is provided with a fitting 98 communicating with the passage 81. On this fitting 98 is a conduit 99. If it is desired to use the structure for operation by means of hydraulics, the tube 99 serves as a means for carrying the exhaust through it to a properly located sump.

In Fig. 10 we have shown a modification in which the blade or vane is stationary, as a movable housing is connected direct to the actuating arm. In this view, the valve plug 101, which may be rotated in any suitable manner, is provided with the axially directed passages 102 and 103 communicating by the lateral passes 104 and 105 with the outlets 106 and 107 formed in the hub 108 projecting outwardly from which is the vane or blade 107a provided with the sealing strip 110, at its end, to engage the inner surface of the housing 111. This housing is also provided with the sealing strip 112 to engage the member 108. The plug 101 may be rotated to the desired position and, when rotated, the housing will rotate around the vane 107a which is stationary. Pivotally connected to this housing is the actuating arm 113 which is pivotally connected at its opposite ends to the re-enforcing strip 114 on the window 115. The general operation of this structure is substantially the same as already described.

Fig. 11 shows a further modification in which a stationary housing has a moving vane and the moving vane is geared directly to the segment arm. In this structure, the housing 117 is provided with the solid portion 118 leading into which is a tube 119 communicating with the cut away portion 121 of the valve plug 120 which is provided with a similar bore 120a. A passage 122 is adapted to communicate with the recess 121, as is likewise the passage 125. The passage 123 is adapted to communicate through the passage 123a with the bore 120a. The passage 124 is adapted to communicate with the recess 121. This plug 120 may be manually operated in any manner desired. The blade or vane 126 is adapted to move around the shaft 129 on which the hub 127 is mounted, this hub 127 carrying teeth 128 meshing with the teeth 139 on the head 130 of the segment arm 132 which is pivotally mounted to one end of the actuating rod or bar 133. The opposite end of this actuating bar 133 is pivotally connected to the re-enforcing strip 134 of the window 135. It is believed that the operation of the device will be obvious with the drawing given in view of the description given above. By manually rotating the plug 120 the partial vacuum may be created at either side of the moving vane 126 and simultaneously the interior of the housing at the opposite side of the vane will be open to the atmosphere.

In Fig. 12 we have shown a further modification in which a stationary housing is used with a movable vane and the shaft on which the vane is mounted rotates in unison with it and is provided exterior of the housing with a connection for the actuating arm. As shown in Fig. 12, the housing 136 is provided with an offset portion 137 formed in the interior 138 of which are passages 139, 140, 141 and 143. Mounted in this block 138 is a valve plug 142 having its periphery cut away at 144 for connecting either passage 139 or 143 to a vacuum pipe 145. Axially mounted on a shaft 146 projecting into the housing is the head 147 of the vane arm 149, there being a sealing strip 148 carried by the member 138 engaging the periphery of the hub 147. Fixedly mounted on the shaft 146 exterior of the housing is an arm 150 which is pivotally connected to one end of the actuating arm 151 the other end of which is pivotally connected to a re-enforcing strip 152 of the window 153. By rotating the valve plug 142, manually or in any other desired manner, passage 140 or 141 may be alternately connected to the atmosphere while passage 143 or 139 is connected to vacuum so as to effect a rocking of the shaft 146 and thus effect a raising and lowering of the window.

Experience has shown that a window operating device constructed in this manner has proven highly efficient and that a fluid operated motor of this type is one which lends itself to various adaptations and uses because of its lightness, compactness, durability and high efficiency in operation.

What we claim is:

1. In a device of the class described, a housing; a wall-forming member in said housing extending radially thereof from the center of said housing to its periphery; a stationary shaft projecting through said housing, said housing being rotatably mounted on said shaft; a radially projected blade carried by said shaft, within said housing and fixedly mounted on said shaft; sealing members carried on the free end of said blade engaging the inner surface of said housing for effecting a seal therewith, said blade and said wall-forming member in said housing cooperating for dividing said housing into a pair of non-communicating compartments, said shaft having a pair of passages formed therein, each of said passages communicating with one of said compartments; a fluid delivery conduit; a rotatable valve on said shaft operable for communicating one of said passages with the delivery conduit and simultaneously communicating the other of said passages with the atmosphere; a gear fixedly mounted on said housing exterior thereof concentric with said shaft; an elongated arm; a supporting plate fixedly mounted on said shaft and projecting outwardly from one side thereof; a pivot for pivotally mounting said arm adjacent one of its ends on said supporting plate; teeth formed on the pivoted end of said arm, meshing with the teeth on said gear.

2. In a device of the class described, a housing; a wall-forming member in said housing extending radially thereof from the center of said housing to its periphery; a stationary shaft projecting through said housing, said housing being rotatably mounted on said shaft; a radially projected blade carried by said shaft, within said housing and fixedly mounted on said shaft; sealing members carried on the free end of said blade engaging the inner surface of said housing for effecting a seal therewith, said blade and said wall-forming member in said housing cooperating for dividing said housing into a pair of non-communicating compartments, said shaft having a pair of passages formed therein, each of said passages communicating with one of said compartments; a fluid delivery conduit; a rotatable valve on said shaft operable for communicating one of said passages with the delivery conduit and simultaneously communicating the other of said passages with the atmosphere; a gear fixedly mounted on said housing exterior thereof concentric with said shaft; an elongated arm; a supporting plate fixedly mounted on said shaft and projecting outwardly from one side thereof; a pivot for pivotally mounting said arm adjacent one of its ends on said supporting plate; teeth formed on the pivoted end of said arm, meshing with the teeth on said gear; an abutment member carried by said housing for engaging said blade and limiting the rotation of said housing beyond a predetermined degree of rotation in either direction.

3. In a device of the class described, a shaft; a hollow leak-proof housing rotatably mounted on said shaft; a wall-forming member within said housing projecting inwardly from the periphery thereof to the center; a sleeve fixedly mounted on said shaft; a radially projected blade within said housing projecting outwardly from the periphery of said sleeve and embracing the same and extending to engage the inner surface of said housing at its periphery and forming therewith a seal, said wall-forming member at its end forming with the portion of the blade extended around said sleeve, a leak-proof seal, said wall-forming member and said blade dividing said housing into a pair of non-communicating compartments; a pair of spaced apart abutment members on said housing, engageable with said blade upon rotation of said housing on said shaft a predetermined distance in either direction for limiting the rotation of said housing in such direction, said shaft having a pair of passages formed therethrough and each communicating through said sleeve with one of said compartments; a gear fixedly mounted on said housing exterior thereof and concentric with said shaft; a supporting plate carried by said shaft exterior of said housing; an elongated arm; a pivot pin for pivoting one end of said arm on said supporting plate offset from the center of said shaft; teeth on the pivoted end of said arm meshing with the teeth of said gear for rocking said arm on its pivot upon rotation of said housing; a delivery conduit adapted for attachment to a source of fluid under non-atmospheric pressure; a valve member embracing said shaft exterior of said housing and rotatable thereon for, upon rotating to one position communicating one of the passages with the delivery conduit and simultaneously communicating with the other of said passages with the atmosphere and upon rotating in the opposite direction, effecting an alternate communication of said passage.

4. In a device of the class described, a shaft; a hollow leak-proof housing rotatably mounted on said shaft; a wall-forming member within said housing projecting inwardly from the periphery thereof to the center; a sleeve fixedly mounted on said shaft; a radially projected blade within said housing projecting outwardly from the periphery of said sleeve and embracing the same and extending to engage the inner surface of said housing at its periphery and forming therewith a seal, said wall-forming member at its end forming with the portion of the blade extended around said sleeve, a leak-proof seal, said wall-forming member and said blade dividing said housing into a pair of non-communicating compartments; a pair of spaced apart abutment members on said housing, engageable with said blade upon rotation of said housing on said shaft a predetermined distance in either direction for limiting the rotation of said housing in such direction, said shaft having a pair of passages formed therethrough and each communicating through said sleeve with one of said compartments, a gear fixedly mounted on said housing exterior thereof and concentric with said shaft; a supporting plate carried by said shaft exterior of said housing; an elongated arm; a pivot pin for pivoting one end of said arm on said supporting plate offset from the center of said shaft; teeth on the pivoted end of said arm meshing with the teeth of said gear for rocking said arm on its pivot upon rotation of said housing; a delivery conduit adapted for attachment to a source of fluid under non-atmospheric pressure; a valve member embracing said shaft exterior of said housing and rotatable thereon for, upon rotating to one position communicating one of the passages with the delivery conduit and simultaneously communicating with the other of said passages with the atmosphere and upon rotating in the opposite direction, effecting an alternate communication of said passage; a manually operable lever for rotating said valve collar.

5. In a device of the class described, a shaft; a hollow leak-proof housing rotatably mounted on said shaft; a wall-forming member within said housing projecting inwardly from the periphery thereof to the center; a sleeve fixedly mounted on said shaft; a radially projected blade within said housing projecting outwardly from the periphery of said sleeve and embracing the same and extending to engage the inner surface of said housing at its periphery and forming therewith a seal, said wall-forming member at its end forming with the portion of the blade extended around said sleeve, a leak-proof seal, said wall-forming member and said blade dividing said housing into a pair of non-communicating compartments; a pair of spaced apart abutment members on said housing, engageable with said blade upon rotation of said housing on said shaft a predetermined distance in either direction for limiting the rotation of said housing in such direction, said shaft having a pair of passages formed therethrough and each communicating through said sleeve with one of said compartments; a gear fixedly mounted on said housing exterior thereof and concentric with said shaft; a supporting plate carried by said shaft exterior of said housing; an elongated arm; a pivot pin for pivoting one end of said arm on said supporting plate offset from the center of said plate; teeth on the pivoted end of said arm meshing with the teeth of said gear for rocking said arm on its pivot upon rotation of said housing; a delivery conduit adapted for attachment to a source of fluid under non-atmospheric pressure; a valve member embracing said shaft exterior of said housing and rotatable thereon for, upon rotating to one position communicating one of the passages with the delivery conduit and simultaneously communicating with the other of said passages with the atmosphere and upon rotating in the opposite direction, effecting an alternate communication of said passage; a manually operable lever for rotating said valve collar; and a link for connecting the free end of said elongated arm to a window slideable upwardly and downwardly.

FRANK C. BEST.
EDWARD V. BEST.

References Cited in the file of this patent

UNITED STATES PATENTS

| Number | Name | Date |
|---|---|---|
| 695,006 | Stowell | Mar. 11, 1902 |
| 963,581 | Kelso | July 5, 1910 |
| 1,037,865 | Chambers | Sept. 10, 1912 |
| 2,304,245 | Dorries | Dec. 8, 1942 |
| 2,389,232 | Conlon | Nov. 20, 1945 |
| 2,511,501 | Floraday | June 13, 1950 |